Figures 1, 2, 3, 4:
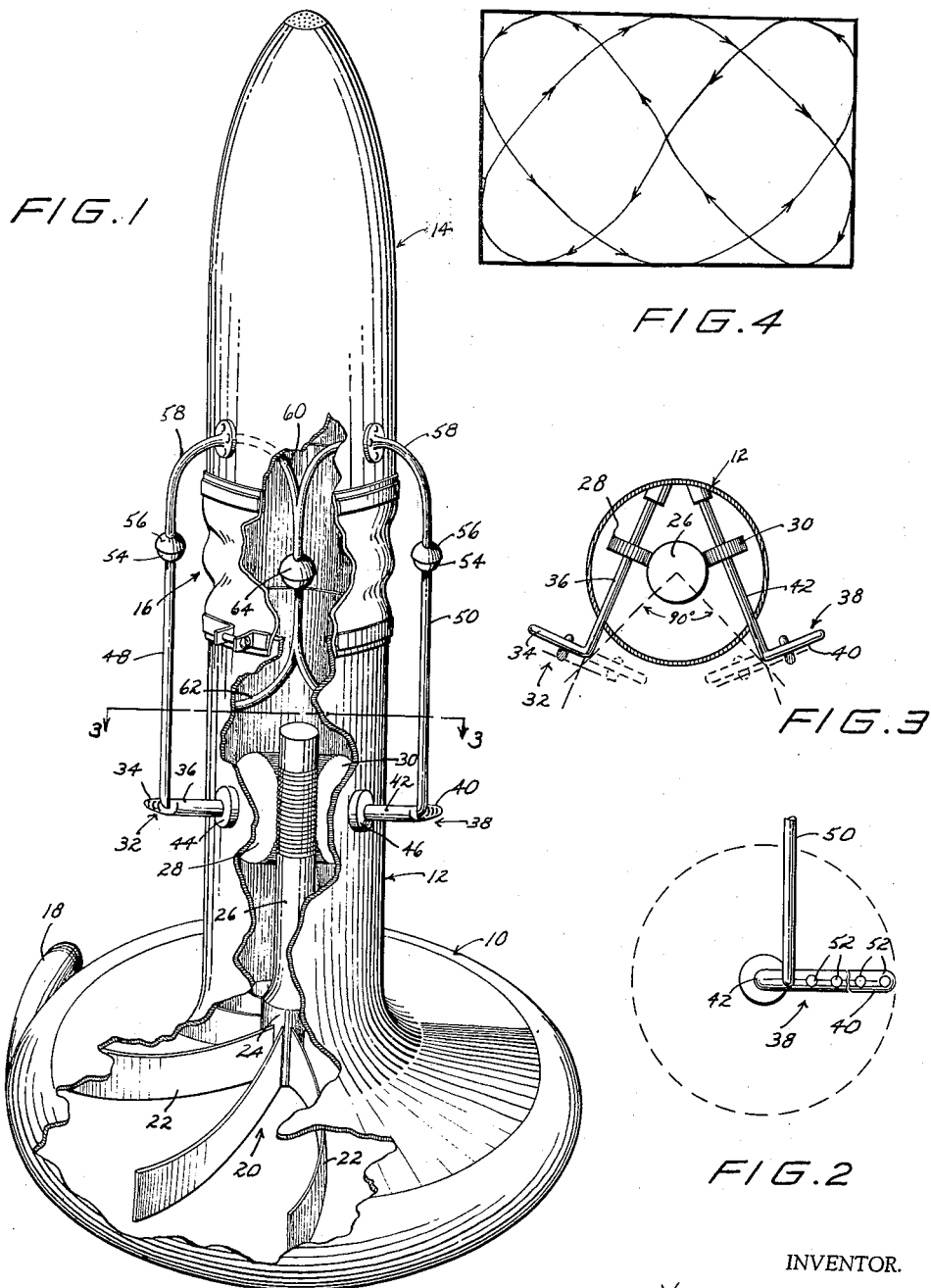

Feb. 7, 1961 YAO T. LI 2,970,774
LAWN SPRINKLER
Filed Oct. 24, 1956

INVENTOR.
Yao T. Li
BY
George L. Greenfield
his atty

United States Patent Office 2,970,774
Patented Feb. 7, 1961

2,970,774
LAWN SPRINKLER

Yao T. Li, 28 Orchard St., Watertown 12, Mass.

Filed Oct. 24, 1956, Ser. No. 618,103

7 Claims. (Cl. 239—240)

This invention relates to water sprinklers and more particularly comprises an improvement over the multi-pattern lawn sprinkler disclosed in my co-pending application Serial No. 541,388 filed October 19, 1955, now Patent No. 2,909,327, dated October 20, 1959.

The primary object of my invention is to provide a lawn sprinkler capable of watering lawns of great area without being moved.

Another important object of my invention is to provide a sprinkler which utilizes to the fullest any given water pressure so that the maximum lawn area may be watered.

Another important object of my invention is to provide a lawn sprinkler which may be adjusted so that it can effectively water lawns of different shapes and sizes.

Still another important object of my invenion is to provide what may be considered a heavy-duty lawn sprinkler capable of performing the above-listed objects and which is not prohibitively expensive.

To accomplish these and other objects, my lawn sprinkler includes among its many features a hollow base which receives the water to be discharged. A conduit extends upwardly from the base and receives the water introduced into it. A nozzle pivotally mounted on the upper end of the conduit by means of a bellows forms a continuation of the conduit and discharges the water over the lawn. Disposed within the base is a turbine driven by the water as it is introduced into the base. A worm gear positioned within the conduit is connected to and driven by the turbine so that whenever water passes into the base, the worm gear turns. The worm gear in turn drives two circular gears which are also disposed within the conduit. Each of the gears carries a crank which includes a crank shaft extending through the wall of the conduit and a crank arm disposed outside of the conduit, and the cranks rotate in response to turning of the circular gears. The centers of rotation of the crank arms are displaced 90° from one another with respect to the axis of the conduit. The crank arms rotate in vertical planes and are connected to upwardly extending rods which in turn are connected by ball and socket joints to arms rigidly connected to the nozzle. Thus, the rods and arms interconnect the cranks with the nozzle across the bellows and cause the turning of the cranks to pivot the nozzle about the upper end of the condit. A fixed pivot point is established for the nozzle on the conduit by means of a pair of spiders, one connected to the conduit and the other connected to the nozzle and which are interconnected by a ball and socket joint in horizontal alignment with the ball joints interconnecting the rods and arms.

The two circular gears disposed within the conduit and driven by the worm gear rotate at different speeds and their speed ratio is a prime fraction. This causes the nozzle to trace a Lissajous curve in response to turning of the gears. The effective lengths of the crank arms may be varied by changing the location of their connections to the rods. This feature allows for the selection of a number of different shapes and sizes of areas to be covered by the nozzle as it discharges its water in a Lissajous pattern.

These and other objects and features of my invention will be more fully understood and appreciated from a reading of the following detailed description of one embodiment thereof selected for purposes of illustration and shown in the accompanying drawings in which:

Figure 1 is a view in perspective with portions broken away of a lawn sprinkler constructed in accordance with my invention, Figure 2 is an elevation view of a portion of the sprinkler illustrated in Figure 1, Figure 3 is a cross sectional view taken along the corresponding section line in Figure 1, and Figure 4 is a diagrammatic view representing both an area which may be watered by the lawn sprinkler illustrated in the other figures and a pattern which may be traced by the water discharged over that area.

The embodiment of my invention illustrated in the drawings, includes in its general organization, a base 10, a conduit 12 supported on the base, and a nozzle 14 pivotally supported on the upper end of the conduit 12 by a bellows 16.

The base 10 is in the form of a hollow disc having an inlet pipe 18 for tangentially introducing water into the base. Disposed within the hollow base is a turbine 20 having a plurality of outwardly extending curved blades 22 positioned to be driven by the water as it enters the base through the pipe 18. The hub 24 of the turbine 20 carries a worm gear 26 conventionally threaded adjacent its upper end.

The worm gear 26 is disposed coaxially within the conduit 12 and drives a pair of circular gears 28 and 30 disposed vertically in the conduit 12. The gears 28 and 30 have different numbers of gear teeth and thus are driven at different speeds by the worm gear 26. The ratio of the speeds of rotation of the circular gears should be a prime fraction such as 11 to 12 or some similar fraction that will be described more fully below. The gear 28 is carried by the crank shaft 36 of a crank 32 which also includes a crank arm 34, while the gear 30 is carried by the crank shaft 42 of a crank 38 having a crank arm 40. The crank shafts 36 and 42 extend through the walls of the conduit 12 and are supported in this position by the bearings 44 and 46 represented diagrammatically in the drawing. The gears 28 and 30 mounted on the crank shafts 36 and 42, respectively, rotate the cranks at different speeds about horizontal axes in response to rotation of the worm gear 26.

In the cross sectional view of the device illustrated in Figure 3, it will be noted that the centers of rotation of the crank arms 34 and 40 are displaced 90° from one another in a horizontal plane about the rotational axis of the worm gear 26. Rods 48 and 50 are adjustably connected to the crank arms 34 and 40, respectively, by a series of openings 52 formed in the crank arms, see Figure 2. The lower portions of the rods 48 and 50 contain right angle bends which easily fit into any one of the openings 52 formed in either of the crank arms. The rods 48 and 50 each carry at their upper ends balls 54 which fit into sockets 56 carried on the ends of the bent arms 58. Each of the arms 58 is connected to the lower end of the casing of the nozzle 14, and the connections of the arms to the nozzle are made 90° apart with respect to the nozzle axis. The ball socket joints 54, 56 which interconnect the rods 48 and 50 with the bent arms 58 permit free movement of the rods and arms with respect to one another and yet serve to transmit motion of the rods 48 and 50 in response to the turning of the cranks 32 and 38 to the nozzle 14. A spider 60 connected to the inner wall of the nozzle and a spider 62 connected to the inner walls of the conduit are joined together by a ball and socket joint 64 which establishes a fixed pivot point for the nozzle in a plane parallel to the ball socket joints interconnecting the rods and the bent arms.

From the foregoing description, those skilled in the art will appreciate that when the circular gears 28 and 30 rotate at different speeds, the cranks 32 and 38 will in turn rotate at different speeds and the forces applied to the nozzle by each of the rod and bent arm connections will be exerted through different distances and will be cyclic in nature. Because these forces are applied at right angles to one another against the nozzle 14 and further because the nozzle is permitted to pivot freely about the ball socket joint 64, these forces can combine to move the nozzle in any direction. In fact, this particular arrangement causes the nozzle to move along a Lissajous curve determined by the ratio of the circular gear speeds.

In Figure 4, I have illustrated a very simple pattern which may be traced by the nozzle and the water discharged by it. If the gear speed ratio of the circular gears 28 and 30 is 2 to 3, a Lissajous curve will be traced having three peaks on one side and two on the adjacent side of the rectangular area covered. Actually a ratio or prime fraction as low as 2 to 3 is not recommended, but has been selected for purposes of illustration because of simplicity. If the gear ratio selected is 10 to 11, or 11 to 12, the number of peaks on the horizontal and vertical sides of the area will be 10 and 11 or 11 and 12. Of course, the larger the area to be normally covered by the sprinkler, the more advantageous it is to employ a higher prime fraction representing the ratio of the speeds of the circular gears. For average use, it has been determined that the ratios of 10 to 11 and 11 to 12 are very satisfactory.

Those skilled in the art will also realize that by varying the effective lengths of the crank arms 34 and 40, that is, by changing the positions where the rods 48 and 50 connect to the crank arms, the area covered by the Lissajous curve may be altered. In Figure 4, the ratio of the sides of the rectangular plot is 2 to 3 and in order to confine the Lissajous curve traced by the nozzle to such a rectangular area, it is necessary that the ratio of the effective lengths of the crank arms be 2 to 3. Of course, any particular rectangular shape may be covered by the sprinkler by selecting the proper openings 52 to receive the bent portions of the rods 48 and 50.

Numerous modifications may be made of my invention without departing from the spirit thereof. Therefore, I do not intend to limit the breadth of my invention to the single embodiment illustrated and described, but rather it is my intention that the scope of my invention be determined by the appended claims and their equivalents.

What I claim as new and desire to secure by Letters Patent of the United States is:

1. Apparatus of the class described comprising a hollow base, a conduit rigidly supported on and extending upwardly from the base, a nozzle mounted on the upper end of the conduit, a bellows interconnecting the nozzle and the conduit allowing the nozzle to pivot about the end of the conduit, a turbine disposed within the base, an opening in the base for receiving fluid to be discharged by the nozzle, said turbine being rotated by the fluid entering the base, a worm disposed in the conduit and connected to and driven by the turbine, a pair of worm gears disposed within the conduit, said worm gears being connected to and driven by the worm, a pair of cranks each connected to and driven by one of the worm gears with the end of the cranks extending through the wall of the conduit, crank arms formed on the ends of the cranks and turning in circles outside the conduit with the centers of the crank arm circles being circumferentially displaced approximately 90° about the center of the conduit, and actuating arms connected between the crank arms and the nozzle and applying bending moments to the nozzle when driven by the turning of the worm gears.

2. Apparatus of the class described comprising a hollow base, means for directing fluid into the base, a conduit extending upwardly from and discharging fluid within the base, a nozzle pivotally supported on the end of the conduit, a pair of cranks each having a horizontal shaft mounted on and extending through the walls of the conduit and a crank arm rotating in a circle in a substantially vertical plane, the centers of the crank arm circles being circumferentially displaced substantially 90° about the center of the conduit, means connected to the cranks and responsive to the fluid entering the conduit for turning the cranks at different speeds, and means interconnecting the crank arms and the nozzle causing the nozzle to pivot about the end of the conduit whereby the fluid discharged traces a Lissajous curve.

3. Apparatus of the class described comprising a hollow base, an inlet for introducing fluid through the base, a conduit mounted on and extending upwardly from the base, a nozzle supported on the end of the conduit, means flexibly interconnecting the nozzle and the conduit, a worm disposed in the conduit, means connected to the worm and responsive to fluid entering the base for turning the worm, a pair of worm gears connected to and driven by the worm and each carrying a shaft extending outwardly through the wall of the conduit, a crank arm connected to the end of each of the shafts, and actuating rods connected between the crank arms and the nozzle for moving the nozzle as fluid enters the base.

4. Apparatus of the class described comprising a hollow base, an inlet for introducing fluid to the base, a conduit supported on and extending upwardly from the base, a nozzle supported on the end of the conduit, a flexible coupling interconnecting the nozzle and the conduit, a worm disposed in the conduit, means responsive to fluid entering the base and connected to the worm for turning the worm, a pair of worm gears engaging the worm and driven by it and each carrying a shaft extending outwardly through the wall of the conduit, crank arms connected to the end of each shaft with the centers of rotation of the crank arms being circumferentially displaced approximately 90° about the axis of the conduit, and actuating rods driven by the crank arms and connected to the nozzle whereby forces applied by the rods to the nozzle by rotation of the crank arms exert moments on the nozzle, the axes of the moments being approximately 90° apart.

5. Apparatus of the class described comprising a base, means secured to the base for introducing fluid into the base, a conduit connected to and leading upwardly from the base, a nozzle mounted for pivotal movement on the conduit, actuating means connected to the nozzle and including cranks driven at different speeds in response to the fluid entering the base for applying moments to the nozzle about substantially mutually perpendicular axes normal to the nozzle axis, and means provided as part of the actuating means for varying the effective length of the crank arms to vary the distance through which the moments are exterted on the nozzle.

6. Apparatus of the class described comprising a base, means secured to the base for introducing fluid into the base, a conduit secured to and extending upwardly from the base, a nozzle mounted for pivotal movement on the upper end of the conduit, actuating means connected to the nozzle including a pair of cranks driven at different speeds in response to fluid which enters the base for applying moments to the nozzle about mutually perpendicular axes normal to the nozzle axis, said conduit carrying said fluid to the nozzle after the actuating means responds to the fluid, and adjustable means provided as part of the actuating means for varying the distance through which the moments are exerted.

7. Apparatus of the class described comprising a base, means secured to the base for introducing fluid into the base, a conduit connected to and extending upwardly from the base, a nozzle mounted for pivotal movement on the upper end of the conduit, a pair of gears rotatably mounted in the conduit, means connected to the gears and responsive to the fluid which enters the base for turning the gears at different speeds, a pair of cranks each connected to one of the gears and having crank arms which turn in circles out of the conduit, the centers of the crank circles being circumferentially displaced approximately 90° about the center of the conduit, actuating rods interconnecting the crank arms and the nozzle and applying moments about mutually perpendicular axes normal to the nozzle axis, and means provided as part of the crank arms for selectively varying the effective lengths of the crank arms.

References Cited in the file of this patent

UNITED STATES PATENTS

| | | |
|---|---|---|
| 1,796,942 | Pottenger | Mar. 17, 1931 |
| 2,746,793 | Wyatt | May 22, 1956 |
| 2,752,195 | Whitehead | June 26, 1956 |